(12) United States Patent
Friedberger et al.

(10) Patent No.: US 7,726,200 B2
(45) Date of Patent: Jun. 1, 2010

(54) INTEGRATED SENSOR FOR AIRFOILS OF AIRCRAFT, PARTICULARLY OF AIRPLANES AND HELICOPTERS, AS WELL AS ROTOR BLADES AND AIRPLANE AIRFOIL

(75) Inventors: Alois Friedberger, Glonn (DE); Christian Gradolph, Unterhaching (DE); Thomas Ziemann, Inning am Holz (DE); Valentin Kloeppel, Munich (DE)

(73) Assignee: EADS Deutschland GmbH, Ottobrunn (DE)

( * ) Notice: Subject to any disclaimer, the term of this patent is extended or adjusted under 35 U.S.C. 154(b) by 201 days.

(21) Appl. No.: 11/591,585

(22) Filed: Nov. 2, 2006

(65) Prior Publication Data

US 2007/0186672 A1   Aug. 16, 2007

(30) Foreign Application Priority Data

Nov. 3, 2005   (DE) .................. 10 2005 052 929

(51) Int. Cl.
*G01M 5/00* (2006.01)
(52) U.S. Cl. ...................................... 73/802
(58) Field of Classification Search .................... 73/802
See application file for complete search history.

(56) References Cited

U.S. PATENT DOCUMENTS

| | | | | |
|---|---|---|---|---|
| 2,764,646 A | * | 9/1956 | Young ..................... 200/83 N |
| 3,643,510 A | * | 2/1972 | Lissau ....................... 73/708 |
| 3,915,009 A | * | 10/1975 | Worden et al. .............. 73/701 |
| 4,063,049 A | | 12/1977 | Pipitone et al. |
| 4,288,835 A | * | 9/1981 | Lee et al. ................. 361/283.4 |
| 5,058,430 A | * | 10/1991 | Aske ......................... 73/497 |
| 5,092,173 A | * | 3/1992 | Aske ....................... 73/514.21 |
| 6,752,020 B1 | | 6/2004 | Sobotta et al. |
| 6,883,380 B2 | * | 4/2005 | Romo ....................... 73/729.2 |
| 7,181,974 B2 | * | 2/2007 | Hegner et al. ............... 73/724 |
| 2004/0232543 A1 | | 11/2004 | Goller et al. |

FOREIGN PATENT DOCUMENTS

| | | |
|---|---|---|
| DE | 199 23 087 A1 | 5/1999 |
| DE | 101 37 184 A1 | 7/2001 |

* cited by examiner

*Primary Examiner*—Lisa M Caputo
*Assistant Examiner*—Octavia Davis
(74) *Attorney, Agent, or Firm*—Crowell & Moring, LLP

(57) ABSTRACT

An integratable sensor for an airfoil of an aircraft such as an airplane and a helicopter comprises a sensor capsule, in whose inner chamber a measuring element for measuring an environmental parameter is situated. A capsule carrier is implemented to accommodate and removably attach the sensor capsule and is integratable in an airfoil of an airplane or a helicopter. Elastic contact elements are used for secure electrical connection of the sensor capsule to the capsule carrier. The sensor capsule is replaceable, while the capsule carrier is permanently integrated in the airfoil, in particular in a rotor blade. The measuring element is, for example, a pressure sensor.

15 Claims, 3 Drawing Sheets

INTEGRATED SENSOR FOR AIRFOILS OF AIRCRAFT, PARTICULARLY OF AIRPLANES AND HELICOPTERS, AS WELL AS ROTOR BLADES AND AIRPLANE AIRFOIL

BACKGROUND AND SUMMARY OF THE INVENTION

This application claims the priority of German patent document 10 2005 052 929.1-22, filed Nov. 3, 2005, the disclosure of which is expressly incorporated by reference herein.

The present invention relates to an integratable sensor for airfoils of aircraft such as airplanes and helicopters, a rotor blade, and an airplane wing.

Sensors are increasingly integrated in wings of airplanes and in rotor blades of helicopters to measure environmental parameters, such as pressure, temperature, flow, etc. Sensors of this type are subjected to especially rough environmental conditions in operation. For example, the sensors may be damaged by incident particles or contaminants, such as dust and insects.

Especially during use in airfoils and/or rotor blades, the sensors are also subjected to extreme weather influences, such as frost, varying temperatures, and varying air pressure.

In the event of contamination or a defect of the sensors, they must be replaced, which requires great effort and correspondingly high maintenance costs of the airplane or helicopter.

One object of the present invention is to reduce the maintenance costs of helicopters and airplanes equipped with sensors.

Another object of the invention is to provide an integratable sensor which may be put into service more easily and rapidly.

These and other objects and advantages are achieved by the integratable sensor for airfoils of aircraft and helicopters according to the present invention, which comprises a sensor capsule with a measuring element situated therein for measuring an environmental parameter. A capsule carrier, which is integratable in an airfoil of an aircraft, is equipped to accommodate and removably attach the sensor capsule; and contact elements are provided for electrically connecting the sensor capsule to the capsule carrier.

According to the present invention, in the event of a sensor defect or contamination, the defective part of the sensor may be replaced easily, without having to remove the entire sensor from the airfoil or the rotor blade. That is, replaceable sensor capsules may be used, which may be exchanged easily in the event of a defect. Electrical connections, cables, etc. do not have to be dismounted and subsequently mounted again; rather they may remain in location. The removal of the rotor blade and integration of a new rotor blade including the required cabling is no longer necessary in the event of a defective sensor, for example. By integrating the measuring element in the sensor capsule and accommodating the latter in the capsule carrier, an especially reliable and robust sensor having an increased service life also results. The maintenance costs of helicopters and airplanes are significantly reduced.

The contact elements are preferably elastic, providing an especially reliable electrical connection between sensor capsule and capsule carrier, which may be produced easily and disconnected again rapidly. There is no danger that the contacts will break or be damaged by penetrating water, as would be the case with contact pins, for example.

The measuring element is advantageously a pressure sensor element, and the integratable sensor may thus be a pressure sensor. However, it is also possible to use other measuring elements, such as for measuring flow, temperature, humidity, acceleration, or other physical parameters.

The capsule carrier is advantageously integrated permanently in a rotor blade or an aircraft airfoil.

The inner chamber of the sensor capsule is preferably enclosed by a capsule wall, whose external shape is tailored to the interior of the capsule carrier. The measuring element is thus protected in the inner chamber of the sensor capsule; in addition, the sensor capsule may be accommodated completely in the capsule carrier and held securely there.

The sensor capsule is preferably provided with a protective cover, which has at least one through opening as an air passage. In this manner, especially good protection of the measuring element in the inner chamber of the sensor capsule results, while the ambient air nonetheless is able to reach the measuring element in the inner chamber.

The surface of the protective cover of the sensor capsule advantageously runs in a plane with the surface of the airfoil in the integrated state. The flow on the airfoil thus remains largely uninfluenced by the sensor.

The continuous opening in the protective cover advantageously runs at least partially diagonally or transversely to the surface of the protective cover. Direct impact of particles on the measuring element in the inner chamber of the sensor capsule is prevented by the structuring of the protective cover because of the geometry of the through openings.

In particular, the sensor element may comprise at least two wafers which are bonded to one another, and are shaped in such a way that they form a cavity sealed by a diaphragm. An especially reliable pressure sensor is thus provided, which is producible cost-effectively and provides precise measurement results. In addition, it has a very long service life.

The sensor capsule is preferably held in the capsule carrier by a magnetic force, which results in a still further reduction of the effort when mounting and/or replacing the sensor capsule. The sensor capsule is nonetheless held securely by the magnetic force in the capsule carrier, so that it withstands high accelerations. The magnetic force is generated, for example, by a permanent magnet or by electromagnets in the capsule carrier, for example. An electromagnet has the special advantage that it exerts an even stronger force for retaining the sensor capsule and may be turned off to replace the sensor capsule. In contrast, a permanent magnet has the advantage of simpler and/or less costly construction of the sensor.

The permanent magnet may, for example, be situated in the capsule carrier, while ferromagnetic metal such as iron is situated in the sensor capsule. Alternatively, it is also possible to situate the permanent magnet in the capsule and ferromagnetic metal in the capsule carrier. The latter arrangement has the advantage that, when the capsule carrier is laminated into the carbon-fiber reinforced plastic material of the rotor blade or the airfoil, damage to the permanent magnet because of the heat developed and possibly exceeding the Curie temperature of the permanent magnet are avoided. Furthermore, it is also possible to situate a permanent magnet in both the sensor capsule and the capsule carrier.

The capsule carrier preferably has planar electrical contacts for contacting the elastic contact elements of the sensor capsule, which achieves a very secure and reliable electrical connection between capsule carrier and sensor capsule, due to the planar surface of the capsule carrier, which is easily disconnectable and is protected against damage such as buckling, breaking, or due to penetration of water.

The capsule carrier advantageously has a wall whose interior is tailored to the external form of the sensor capsule. Thus, for example, a formfitting integration of the sensor capsule into the capsule carrier may be performed. In addition, the sensor capsule is secured against strong radial forces, such as occur in the rotating rotor blade, for example, by the guide in the capsule carrier.

The capsule carrier and the sensor capsule are preferably mutually engaged using a notch and a corresponding projection, in order to prevent relative twisting. In this manner, the sensor capsule can be introduced in a defined way into the capsule carrier, so that the contact elements of the sensor capsule each rest precisely on the planar contacts of the capsule carrier. Mutual twisting of sensor capsule and capsule carrier is prevented by the notch and the corresponding projection.

The sensor element advantageously comprises a cavity which is hermetically sealed by a flexible diaphragm, and the interior of the cavity diametrically opposite the diaphragm is tailored to the contour of the diaphragm in the deflected state. The diaphragm is protected better from damage in this manner, since the diaphragm itself rests flat on the contoured interior of the cavity in the event of inhomogeneous eccentric load. Moreover, an overload protection at excessive pressure results, due to the delimitation of the deflection of the diaphragm, by which tearing of the diaphragm is prevented.

According to one aspect of the present invention, a rotor blade for helicopters is provided, in which a sensor according to the present invention is integrated.

According to a further aspect of the present invention, an airplane airfoil is provided, in which a sensor according to the present invention is integrated.

Other objects, advantages and novel features of the present invention will become apparent from the following detailed description of the invention when considered in conjunction with the accompanying drawings.

DETAILED DESCRIPTION OF THE DRAWINGS

Figure 1:
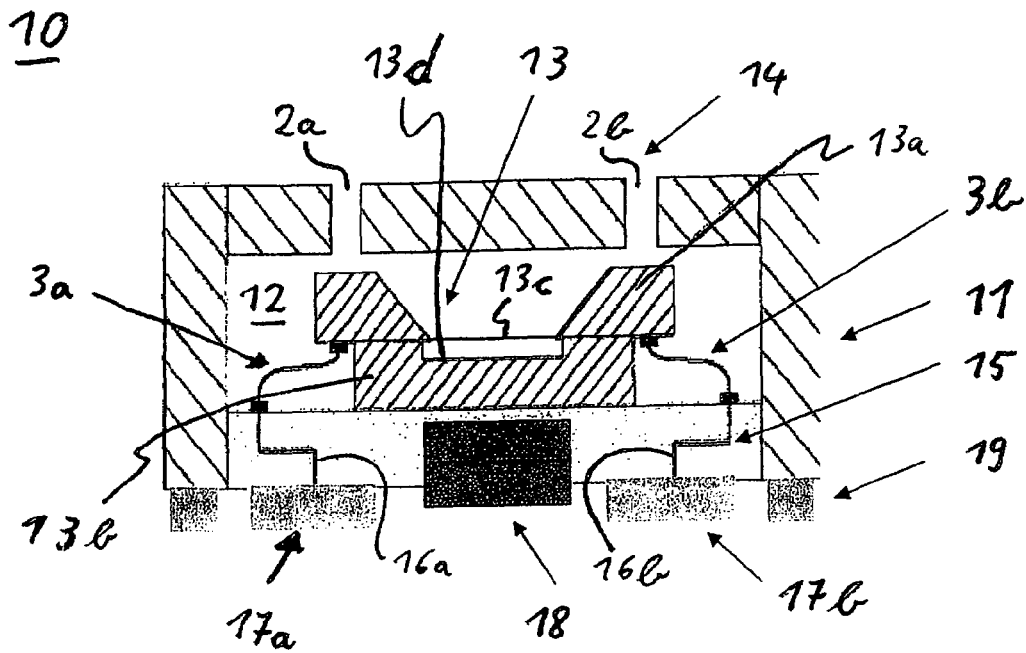
FIG. 1 shows a sensor capsule as part of the sensor according to a preferred embodiment of the present invention.

FIG. 1 shows a schematic view of a sensor capsule 10 as part of the integratable sensor according to a preferred embodiment of the present invention. The sensor capsule 10 is implemented in this example as a pressure sensor capsule and/or pressure sensor. It comprises a capsule wall 11, which encloses an inner chamber 12, in which a measuring element 13 is situated (in this example a pressure measuring element). A protective cover 14 is located on the top of the sensor capsule 10, which has two through openings 2a, 2b. The through openings 2a, 2b form an air access to the measuring element 13 and/or a connection between the inner chamber 12 and the outer environment of the sensor capsule. The protective cover 14 closes the inner chamber 12 and/or separates the measuring element 13 placed therein from the exterior. Typically, multiple through openings 2a, 2b are situated in a circle on the protective cover 14. They are located in the outer area, so that they do not lie directly vertically above the measuring element and/or above the diaphragm 13c. Particles coming through the openings 2a, 2b thus do not reach the diaphragm of the measuring element 13.

A capsule floor 15, on which the measuring element 13 is mounted, is located on the bottom of the sensor capsule, and closes the inner chamber 12 at the bottom of the sensor capsule. Electrical bushings 16a, 16b are situated in the capsule floor 15, each of which forms an electrically conductive connection between the interior 12 and external contact elements 17a, 17b. The contact elements 17a, 17b are situated on the bottom of the capsule floor 15 and are implemented as elastic contact pads.

A permanent magnet 18, which is situated in the capsule floor 15, exerts a magnetic force to fasten the sensor capsule 10 in the capsule carrier. The permanent magnet 18 is integrated in the capsule floor 15 and projects partially out of the bottom of the capsule floor 15.

A seal element 19, which is circular and/or a ring and is attached below the cylindrical capsule wall 11, is situated on the bottom of the sensor capsule 10. The seal element 19 is used for sealing the bottom of the sensor capsule 10 having the contact elements 17a, 17b located therein when the sensor capsule 10 is integrated in the capsule carrier. All components which are located in the area below the sensor capsule 10 in the integrated state are protected from moisture and other interfering environmental influences by the seal element 19.

The measuring element 13 (implemented in this example as a pressure sensor or pressure sensor element) comprises an upper wafer 13a and a lower wafer 13b, which are bonded to one another. The upper wafer 13a is manufactured in this example from silicon and comprises a central partial area which is especially thin and forms a flexible diaphragm 13c. Piezoelements and/or piezoresistors are situated on the flexible diaphragm 13c and generate electrical signals when the diaphragm 13c bends.

The lower wafer 13b is produced from Pyrex or silicon and has a recess 13d on its top in the center, which is hermetically sealed by the diaphragm 13c lying above it and forms a sealed cavity. In the event of a change of the pressure acting externally on the diaphragm 13c, it is bent and a measuring signal is output.

Contacts 3a, 3b or chip contacts are provided to relay the measuring signals which are generated by the measuring element 13, for example, in the form of wire bonds or flip chips, which form an electrical connection between the measuring element 13 and the electrical bushings 16a, 16b in the capsule floor 15.

Figure 2:
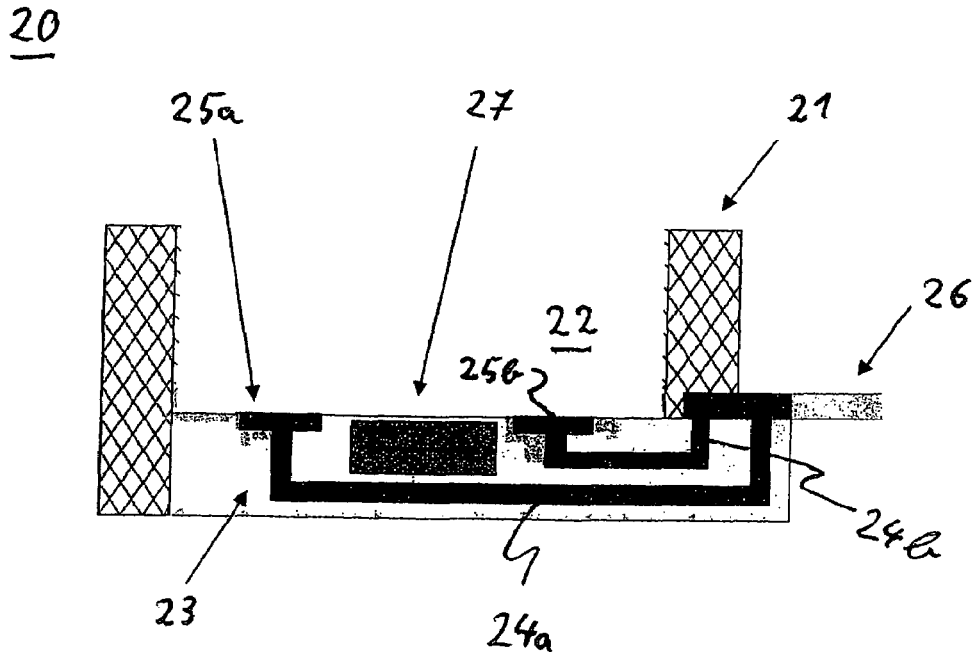
FIG. 2 shows an example of a capsule carrier for accommodating the sensor capsule shown in FIG. 1.

FIG. 2 shows schematically a section through a capsule carrier 20, which forms a further element of the integratable sensor according to the present invention, according to a preferred embodiment of the present invention. The capsule carrier 20 has a cylindrical carrier wall 21 on its exterior, which encloses an inner chamber 22, and is used to accommodate the sensor capsule 10 (shown in FIG. 1). For this purpose, the size and shape of the interior of the carrier wall 21 is tailored to the exterior of the capsule wall 11 of the sensor capsule 10 shown in FIG. 1. The dimensions of the carrier wall 21 are selected so that the sensor capsule 10 may easily be inserted into and removed from the capsule carrier 20, while a secure hold of the sensor capsule 10 is nonetheless ensured in relation to lateral displacement (e.g., because of accelerations which occur).

The bottom of the capsule carrier 20 is formed by a carrier floor 23, in which electrical bushings 24a, 24b are provided. The latter electrically connect planar contact elements 25a, 25b, which are situated on the top of the carrier floor 23, to a connection element 26 in the form of a connection cable on the exterior of the capsule carrier 20.

The planar contact elements 25a, 25b are integrated in the top of the carrier floor 23, so that it lies in the same plane as the tops of the planar contact elements 25a, 25b. The latter electrically contact the elastic contact element 17a, 17b on the bottom of the sensor capsule 10 (FIG. 1) when the sensor capsule 10 is located in the inner chamber 22 of the capsule carrier 20. The implementation of the contacts on the planar surface ensures that the capsule carrier that is to be integrated in the rotor blades has a high service life and great reliability.

A permanent magnet 27, which is integrated in the center of the carrier floor 23, and fastens the sensor capsule 10 in the capsule carrier 20, exerts a magnetic force on the permanent magnet 18 of the sensor capsule 10 when the sensor capsule 10 is located in the capsule carrier 20.

Figure 3:
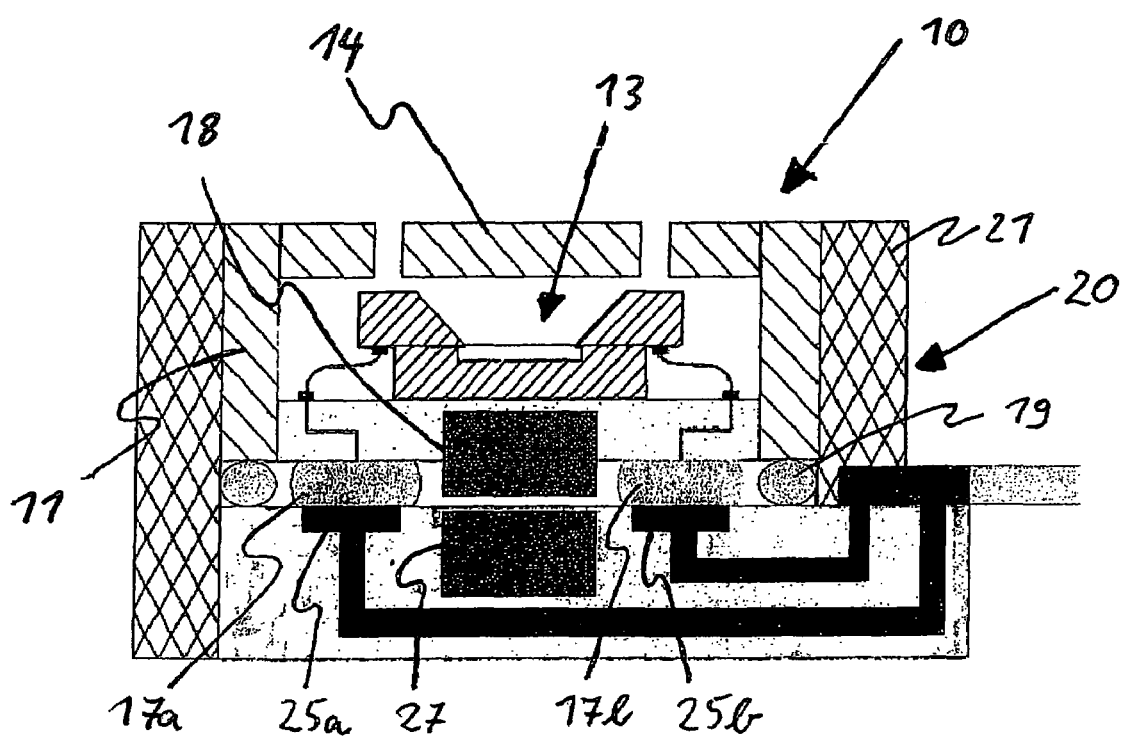
FIG. 3 shows schematically the integratable sensor according to a preferred embodiment of the present invention, in a sectional view.

FIG. 3 shows schematically a sectional view of the integratable sensor according to a preferred embodiment of the present invention, the sensor capsule 10 being mounted in the capsule carrier 20. (The elements of the sensor capsule 10 and the capsule carrier 20 are identified by the same reference numerals as in FIGS. 1 and 2, reference being made to the description of FIGS. 1 and 2.)

In the mounted state, the sensor capsule 10 is located completely in the capsule carrier 20. (That is, the top of the sensor capsule 10 lies in a plane with the top of the carrier wall 21 of the capsule carrier 20.) The sensor capsule 10 is fixed vertically in the capsule carrier 20 by the magnetic forces which are mutually exerted by the permanent magnets 18, 27. The lateral and/or horizontal fixing is produced by the enclosing carrier wall 21. The elastic contact elements 17a, 17b of the sensor capsule 10 are easily pressed together and/or compressed in the vertical direction and press completely against the elements 25a, 25b of the capsule carrier which are planar. They are enclosed by the seal element 19, which is also easily compressible in the vertical direction and seals the space between the sensor capsule 10 and the capsule carrier 20. The penetration of moisture to the electrical contact is thus prevented when moisture penetrates downward along the face between the interior of the carrier wall 21 and the exterior of the capsule wall 11.

Figure 4:
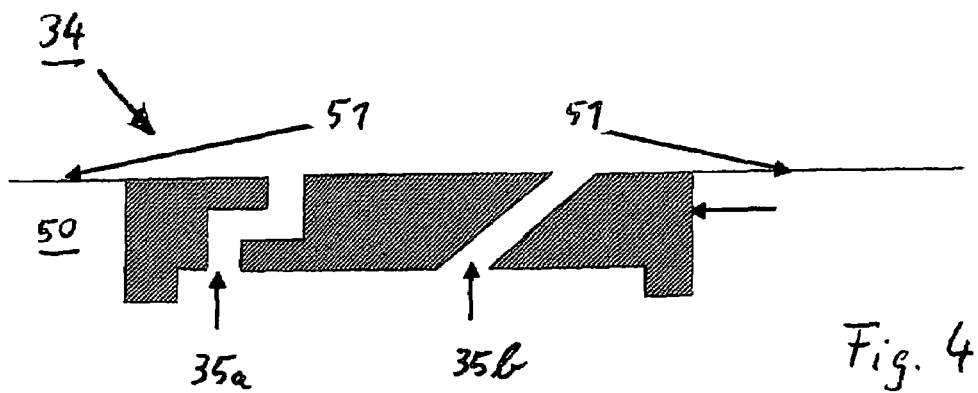
FIG. 4 shows schematically a section through a protective cover according to a further preferred embodiment.

FIG. 4 shows a section through a protective cover 34 according to a further preferred embodiment of the invention, which is integrated in an airfoil 50 and whose surface runs planar with the surface 51 of the airfoil 50. The protective cover 34 corresponds largely in its function to the protective cover 14 of the sensor capsule 10 shown in FIG. 1. However, the protective cover 34 has through openings 35a, 35b, which are geometrically shaped so that direct incidence of particles, which are located above the protective cover on the measuring element 13 lying underneath (FIG. 1), is prevented. That is, the protective cover 34 is structured in such a way that the through openings 35a, 35b run not on the shortest path through the protective cover 34, but rather diagonally and/or stepped or in stages through the protective cover 34. The measuring element 13 in the inner chamber of the sensor capsule is thus effectively protected from external influences, in particular from incident particles.

Figure 5A:
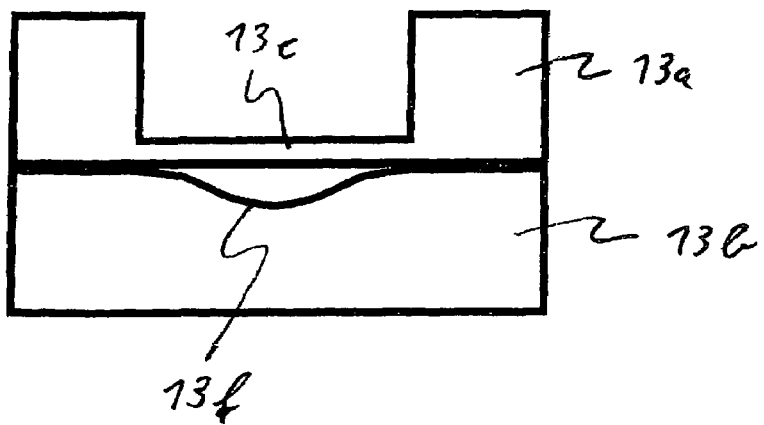
FIGS. 5a and b show a measuring element in the form of a pressure sensor element according to especially preferred embodiments of the present invention, in the linear and bent states of the diaphragm.
Figure 5B:
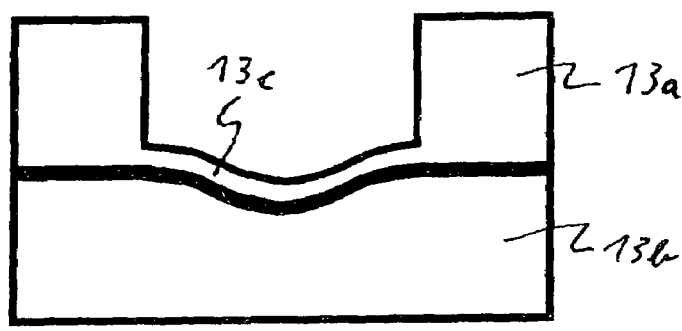

FIGS. 5a and 5b show the measuring element 13 of the sensor capsule 10 of FIG. 1 in an especially preferred embodiment. FIG. 5a shows the measuring element 13 with the diaphragm 13c not deflected, while FIG. 5b shows the measuring element 13 with the diaphragm 13c maximally deflected.

In the embodiment shown here, the upper wafer 13a having its diaphragm 13c is implemented in the manner already described with reference to FIG. 1. However, the lower wafer 13b has a depression or recess 13f, which is tailored to the shape of the diaphragm 13c in the state with maximum allowed deflection. That is, the surface of the lower wafer 13b, which represents the lower delimitation of the cavity 13d is shaped to conform to the contour of the diaphragm 13c, for the case that the diaphragm 13c has the maximum allowed deflection.

Thus, the diaphragm 13c presses flatly against the lower wafer 13b, which forms a stop for the deflected diaphragm 13c, immediately in the event of an inhomogeneous eccentric load and is not destroyed.

Normal pressure measurement is not influenced, since the diaphragm 13c does not press against the stop in this case. The production of this geometry is made possible in that techniques of precision engineering are used to process the wafer, such as performed in the production of microlenses, for example.

During the production, the upper wafer 13a and the lower wafer 13b are bonded. The upper wafer 13a forms the diaphragm wafer, while the lower wafer 13b is used to seal and generate the cavity having a reference pressure, such as vacuum. The depth of the cavity may be tailored so that the diaphragm 13c hits on the bottom (i.e., at the top of the lower wafer 13b) at high deflection. A delimitation of the deflection of the diaphragm and an overload protection at too high a pressure thus results, which protects the diaphragm 13c from tearing. In the event of a homogeneous load of the diaphragm 13c, as occurs during overpressure, for example, the special shaping of the depression 13f, as shown in FIGS. 5a and 5b, is not absolutely necessary, since the middle of the diaphragm is maximally deflected in this case and impacts the delimitation. However, the diaphragm 13c would deflect too strongly locally and break in the event of too strong a homogeneous load, as may occur through strong particle impact in proximity to the diaphragm edge, for example. In this case, damage to the diaphragm 13c is prevented by the special design of the measuring element, as shown in FIGS. 5a and 5b.

In the following, still further possible advantageous details of the present invention are shown:

Because the transitional resistance during the electrical contacting of the sensor capsule 10 to the capsule carrier 20 typically will not be constant, a four-point measurement using six contacts is performed as in a Wheatstone bridge circuit having four measuring resistors. A possible variation of transitional resistance in the area of the elastic contact elements 17a, 17b thus does not influence the measurement precision. The seal element 19 and the elastic contact pads 17a, 17b may, for example, comprise a single layer over the entire area, which is formed by elastomer films having an anisotropic, for example, exclusively vertical electrical conductivity.

Instead of fixing the sensor capsule 10 in the capsule carrier 20 using magnetic force, it may also be fixed by a screwable cap nut, which is seated on the capsule carrier 20. The sensor capsule may thus also withstand especially high accelerations in the radial and vertical directions, for example, at over 1000 g in the radial direction and over 100 g in the vertical direction.

The use of permanent magnets has the special advantage of simplifying mounting and dismounting, with the sensor capsule 10 being secured by the guide in the capsule carrier 20 in relation to the radial forces, in addition to the magnetic fixing.

Alternatively, fixing by an electromagnet, attached in the capsule carrier 20 is also possible. An even stronger force is thus generated, which additionally may be turned off to replace the sensor capsule 10. In contrast, using permanent magnets offers the advantage that additional cabling for the electromagnets is unnecessary, and also works when the onboard electronics are turned off. (No noteworthy forces then act on the sensor capsule, however.)

The permanent magnet may, for example, be situated only in the capsule carrier 20, while only ferromagnetic metal, such as iron, is situated in the capsule 10. An especially simple structure thus results. However, it is also possible to situate the permanent magnet only in the sensor capsule 10 and provide only ferromagnetic metal, such as iron, in the capsule carrier 20.

The capsule may be introduced in a defined way into the capsule carrier 20 by a notch on the capsule carrier 20 and a corresponding projection on the capsule 10, which prevents twisting in relation to the positioning provided.

The contact elements 17a, 17b thus rest precisely on the planar contact elements 25a, 25b of the capsule carrier 20.

Furthermore, notches may be provided on the sensor capsule 10, which allow an engagement for simple pulling out of the sensor capsule 10 against the magnetic force.

The inner chamber 12 may be filled up to approximately half its height with silicone, so that the contacts 3a, 3b or chip contacts are protected from moisture and/or penetrating dirt or vibrations, and the volume of the water which may collect in the inner chamber 12 is thus limited. This prevents destruction of the diaphragm 13c when the water freezes, since a minimum quantity of frozen water is required for this purpose as a function of the geometry of the measuring element 13. Furthermore, a protective diaphragm made of parylene may be used on the diaphragm 13c, which offers special protection against moisture.

Wafer level packaging technology may be used when producing the measuring element. This technology has been used until now in the production of MEMS elements and offers a significant simplification and/or cost savings. An additional wafer is bonded above the upper wafer 13a, which assumes the function of the protective cover 14 or 34. (See FIGS. 1 and 4.) Alternatively, this function may be assumed by the cap nut described above, which may be used instead of a permanent magnet to attach the sensor capsule 10 in the capsule carrier 20, for example.

The lower wafer 13b may also be provided with electrical bushings on the bottom. Furthermore, MEMS seals and elastic MEMS contacts may be developed as part of the chip capsule, which results in further miniaturization, simplification, and cost savings, since production may be performed in a batch process. Precision engineering methods are then no longer necessary for integrating the various components (capsule wall 11, protective cover 14, capsule floor 15, measuring element 13, contacts 3a, 3b, contact elements 17a, 17b, seal element 19, permanent magnet 18). The sensor capsule comprises a single micromechanical chip, which results by connecting various layers (e.g., bonding multiple wafers). The uppermost layer forms a wafer which assumes the function of the protective cover 14 or 34. The two layers for perceiving the sensor function are located underneath (analogous to 13a, 13b). In contrast to the layer 13b from FIG. 1, the layer contains electrical bushings through the layer. The lowermost layer finally forms the elastic contacts and seal, which are produced by spinning on and texturing a corresponding polymer, for example.

A permanent-magnet layer may also be applied to the lowermost layer, e.g., by sputtering. Because of the low layer thickness, the magnetic force is significantly less than if conventional permanent magnets are used, but a significantly lower force is required to compensate for the acceleration forces arising, since the mass of this MEMS capsule is significantly less than that of the sensor capsule 10 described in FIG. 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sensor for an airfoil of aircraft, comprising:
    a sensor capsule having a capsule floor, a protective cover, and a capsule wall extending between the floor and the cover;
    a measuring element, situated in an interior of the sensor capsule, for measuring an environmental parameter and providing signals;
    contacts in the sensor capsule to relay the signals provided between the measuring element and contacts in the capsule floor;
    external contact elements situated on the bottom of the capsule floor and electrically connected to the contacts in the capsule floor;
    a capsule carrier having a structure which is integratable in an airfoil of an aircraft, for receiving and removably attaching the sensor capsule; and
    contact elements disposed in the capsule carrier for electrically connecting the external contact elements to the capsule carrier;
    wherein the measuring element comprises at least two wafers bonded to one another; the wafers are shaved to form a cavity; and the cavity is sealed by a diaphragm.

2. The sensor according to claim 1, wherein the external contact elements are elastic.

3. The sensor according to claim 2, wherein the capsule carrier has a wall with an interior tailored to an external shape of the sensor capsule.

4. The sensor according to claim 1, wherein the measuring element is a pressure sensor element.

5. The sensor according to claim 1, wherein the capsule carrier is permanently integrated in a rotor blade or an airplane airfoil.

6. The sensor according to claim 1, wherein the capsule wall has an external shape that is tailored to an interior of the capsule carrier.

7. The sensor according to claim 1, wherein the protective cover has at least one through opening as an air passage.

8. The sensor according to claim 7, wherein the surface of the protective cover of the sensor capsule runs in a plane with the surface of the airfoil in the integrated state of the sensor.

9. The sensor according to claim 7, wherein the through opening in the protective cover runs at least partially diagonally or transversely to the surface of the protective cover.

10. The sensor according to claim 1, wherein the sensor capsule is held in the capsule carrier by a magnetic force.

11. The sensor according to claim 1, wherein the contact elements disposed in the capsule carrier are planar electrical contacts for contacting the external elastic contact elements.

12. The sensor according to claim 1, wherein the capsule carrier and the sensor capsule are mutually engaged by a notch and a corresponding projection, to prevent mutual twisting.

13. The sensor according to claim 1, wherein an interior of the cavity, diametrically opposite the diaphragm, is tailored to a contour of the diaphragm in a deflected state.

14. A helicopter rotor blade comprising a sensor according to claim 1, integrated therein.

15. An airplane airfoil, comprising a sensor according to claim 1, integrated therein.

* * * * *